United States Patent [19]

Bachmann

[11] 3,855,628

[45] Dec. 17, 1974

[54] TAPE HEAD ROTATOR MECHANISM

[75] Inventor: Mario E. Bachmann, Chicago, Ill.

[73] Assignee: Motorola, Inc., Franklin Park, Ill.

[22] Filed: Feb. 16, 1973

[21] Appl. No.: 333,411

[52] U.S. Cl. .......... 360/106
[51] Int. Cl. .......... G11b 21/08
[58] Field of Search....... 179/100.2 CA, 100, 2 MD; 274/4 A; 360/106, 78

[56] References Cited

UNITED STATES PATENTS

| | | | |
|---|---|---|---|
| 3,332,085 | 7/1967 | Gray | 179/100.2 C A |
| 3,376,396 | 4/1968 | Bradt et al. | 179/100.2 C A |
| 3,614,342 | 10/1971 | Siebert | 360/106 |

*Primary Examiner*—Harry N. Haroian
*Assistant Examiner*—John W. Shepperd
*Attorney, Agent, or Firm*—Donald J. Lisa; Vincent J. Rauner

[57] ABSTRACT

A tape head rotator mechanism in a multiple track tape recorder/reproducer includes a tape head connected to a shaft with a pinion on the opposite end thereof which engages a cam connected to a driving gear driven by a worm gear. The cam longitudinally displaces the shaft with the pinion gear engaging gear teeth on the face of the drive gear for rotating the shaft and head 180°, and the pinion subsequently is disengaged from the gear teeth with the tape head returning to engagement with the tape by spring action.

4 Claims, 7 Drawing Figures

TAPE HEAD ROTATOR MECHANISM

BACKGROUND OF THE INVENTION

Both reel and cassette type tape recorders/players have utilized multi-track tapes for recording and reproducing sound. Generally, for positioning the tape head from one track to another in cassette-type players it has been necessary to take the cassette out of the player, turn it over and place it back in the player. Conventional reel tape devices required similar operations. In order to eliminate this objectional feature, dual tape heads have been proposed which require the tape to travel in opposite directions without removing the cassette cartridge. This device has been proved expensive.

SUMMARY OF THE INVENTION

It is an object of the present invention to provide improved apparatus for reel-to-reel type tape recorder/reproducers wherein all the tracks on a multi-track tape may be played without reversing the position of the cartridge or the reels in the recorder/reproducer.

It is another object of this invention to provide a less costly reel-to-reel tape recorder/reproducer which will reproduce all the tracks on a multi-track tape and which utilizes only one tape head.

In one embodiment a tape head rotation mechanism in a reel-to-reel tape player is activated to withdraw the tape head from engagement with the tape at the completion of one set of tracks. A cam is secured to the face of a dirve gear which is driven by a worm gear, or gear rack. The cam rotates causing a pinion at the end of the shaft opposite the tape head to longitudinally displace the shaft within its housing, thus disengaging the tape head from engagement with the tape. The drive gear continues to rotate with the pinion engaging a section of gear teeth on the face of said drive gear, thus rotating the pinion with the shaft and tape head following thereafter. After the tape head has been rotated 180°, the pinion disengages from the gear section and the tape head is longitudinally moved by a return spring to engage the tape which moves in the opposite direction from the original tape movement.

In another embodiment a cam track located in a base plate is utilized for guiding a spring loaded track pin for controlling the motion of the tape head during disengagement from the tape, rotation and re-engagement with the tape. Actuation of the tape head rotator mechanism is accomplished by a solenoid which is mechanically linked to a pin extending upwardly through the base plate and moves the carriage bracket and gear plate. The head rotates and a return spring causes re-engagement of the tape head with the tape.

A carriage bracket is supported on and rides on a pair of guide rails with one rail engaging step-up cam slots in the guide rails and the second rail engaging horizontal cam slots with the tape head being raised with respect to the base plate to provide clearance with the tape head being disengaged from the tape and rotating. The rear of the carriage bracket which rides on the second guide bar moves parallel to but not vertically with respect to the base plate. The tape head frame engages the carriage rack through ball bearing movements which permit rotation of the carriage rack. The tape head rotates as the track pin moves transversely across the base plate in the cam track. Rotation of the tape head is accomplished by a pinion connected to the tape head bracket and a gear rack connected to the gear rack plate with the pinion and gear rack engaging each other and acting with the transverse movement of the track pin. With rotation complete the return spring causes the tape head to re-engage the tape in an engaged condition with the track pin going to a rest position in a second leg of the cam track. With subsequent activation, the tape head is rotated in the opposite direction.

DETAILED DESCRIPTION

Figure 1:
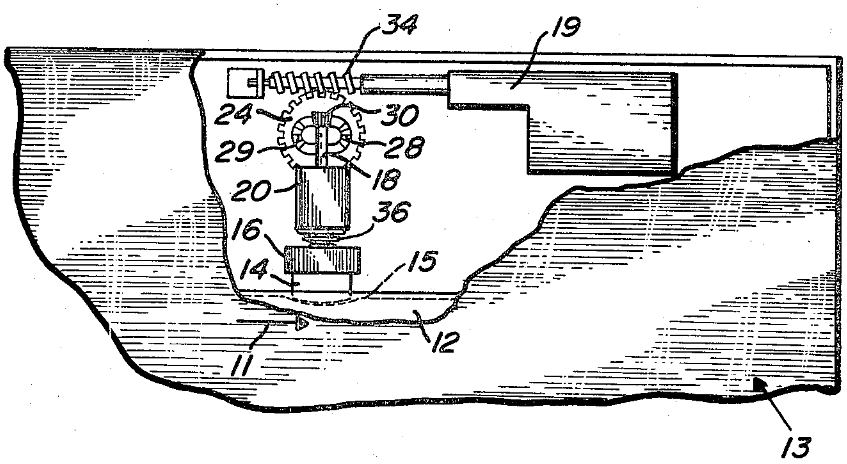
FIG. 1 is a cutaway top plan view of an embodiment of the present invention installed in a cassette tape recorder/reproducer.
Figure 2:
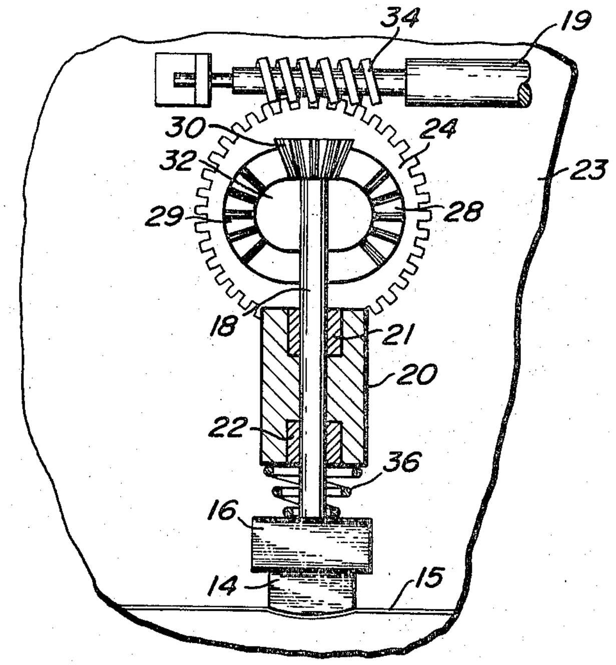
FIG. 2 is an expanded, top elevation view in cross-section of the embodiment of FIG. 1 with the invention in the de-activated condition.
Figure 3:
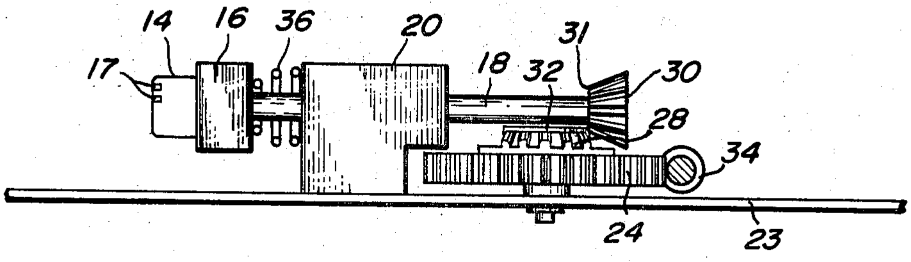
FIG. 3 is a side elevation view in cross-section of the embodiment of FIG. 1.

Referring to FIGS. 1–3 there is shown a cassette recorder/reproducer 13. HOwever, a conventional reel tape recorder/reproducer, or other tape device may be used. With a cassette 12 inserted in the recorder/reproducer 13, the tape head or transducer 14 engages tape 15 with the magnetic pickup 17 of the head indexed to one set of tracks on the tape 15. The tape is driven from left to right as shown by arrow 11, until it reaches the end of the reel. Positioning the tape head to another set of tracks becomes necessary for fully utilizing the tape. Traditionally, the cassette cartridge had to be extracted from the recorder/reproducer, turned over and reinserted before a return track could be utilized. With the present invention this operation is unnecessary. The transducer head 14 is rotated 180° to reposition the pickup portion 17 (FIG. 3) to a different set of tracks on the tape rather than repositioning the tape. The direction of the tape is then reversed in a known manner to move from right to left making it possible to play back or record on the new set of tracks.

The apparatus for rotating the tape head 14 includes the transducer head housing 16 attached to a shaft 18 which rides in bearings 21 and 22 in housing 20. The housing is fastened to the chassis 23 of the recorder/reproducer and permits both longitudinal and rotational motion of the shaft 18. With the worm gear or gear rack 34 actuated by the actuator 19 which may be done either manually or electromechanically such as with a solenoid which may be actuated by the tape, a drive gear 24, being meshed therewith, rotates in the counter clockwise direction as viewed in FIG. 2. This rotation in a counter clockwise direction causes an eliptical cam 32 to engage the base 31 of a pinion 30 to longitudinally displace the shaft 18 against the pressure of spring 36 with the tape head 14 being disengaged from the magnetic tape. The head 14 is withdrawn from the cassette cartridge in this manner with the pinion 30 subsequently engaging a section of gear teeth 28 coaxially mounted with and driven by drive gear 24. The drive gear 24 through the gear teeth 28 causes the pinion to rotate and the shaft 18 to follow therewith. The number of gear teeth 28 limits the transducer head 14 rotation to 180°, at which point the pinion 30 becomes disengaged from the section of gear teeth 28 and no longer rotates. Subsequently the spring 36 returns the transducer head to play/record position with the pickup portions 17 engaging a different set of tracks. The tape then travels in the opposite direction and either records or reproduces sound depending on its mode of operation. The rotator is then ready for subsequent rotation. Gear 24 may be again driven in the counter clockwise direction, with pinion 30 engaging the section of gear teeth 29 which has been brought in position by the prior rotation of the drive gear 24 to rotate the tape head 180°.

Referring to FIGS. 4–7 there is shown another embodiment of the present invention which utilizes a cam track 46 in a base 48 for guiding a spring loaded track pin 50 to the transducer tape head 52 from the tape 54, rotate the same 180° and re-engage it with the tape 54.

Figure 7:
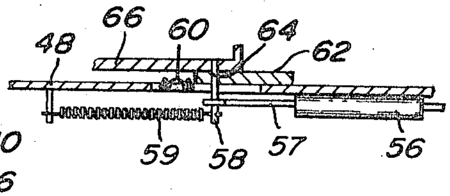
FIG. 7 is a side elevation view in partial cross-section of the actuator mechanism of the embodiment of FIG. 4.

Actuation of the tape head rotator mechanism may be manual or electromechanical. FIG. 7 shows a solenoid 56 mechanically linked by rod 57 to an actuating pin 58, which extends upwardly through slot 60 in the base plate 48, through a hole 64 in a rotatably mounted gear rack plate 62 and through the carriage bracket 66. Upon actuation solenoid 56 draws rod 57 from left to right (FIGS. 4, 6 and 7) disengaging the tape head 52 from the tape 54. Rod 58 linked to rod 57 is drawn in slot 60 to cause the carriage bracket 66 and gear rack plate 62 to move away from the tape. The tape head support frame connected to the carriage bracket 66 by ball bearing movements 86 and 88 is also moved away from the tape. Tension increases in return spring 59 as the tape head is disengaged. The spring causes the tape head to re-engage the tape after the tape head is rotated.

The carriage bracket 66 is supported on a pair of guide rails 68 and 70. Guide rail 68 engages step-up cam slots 72 and 74, in guide bars 76 and 78 respectively. Guide rail 70 rides in slots 80 and 82 of guide bars 76 and 78, respectively, which provide horizontal guide means. Step-up cam slots 72 and 74 cause the tape head 52 to raise with respect to the base plate 48 when it is moved away from the tape by the solenoid 56.

Figure 4:
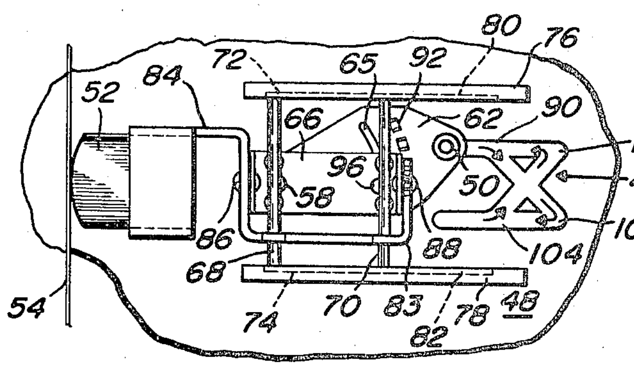
FIG. 4 is a top plan view of another embodiment of the present invention.
Figures 5, 6:
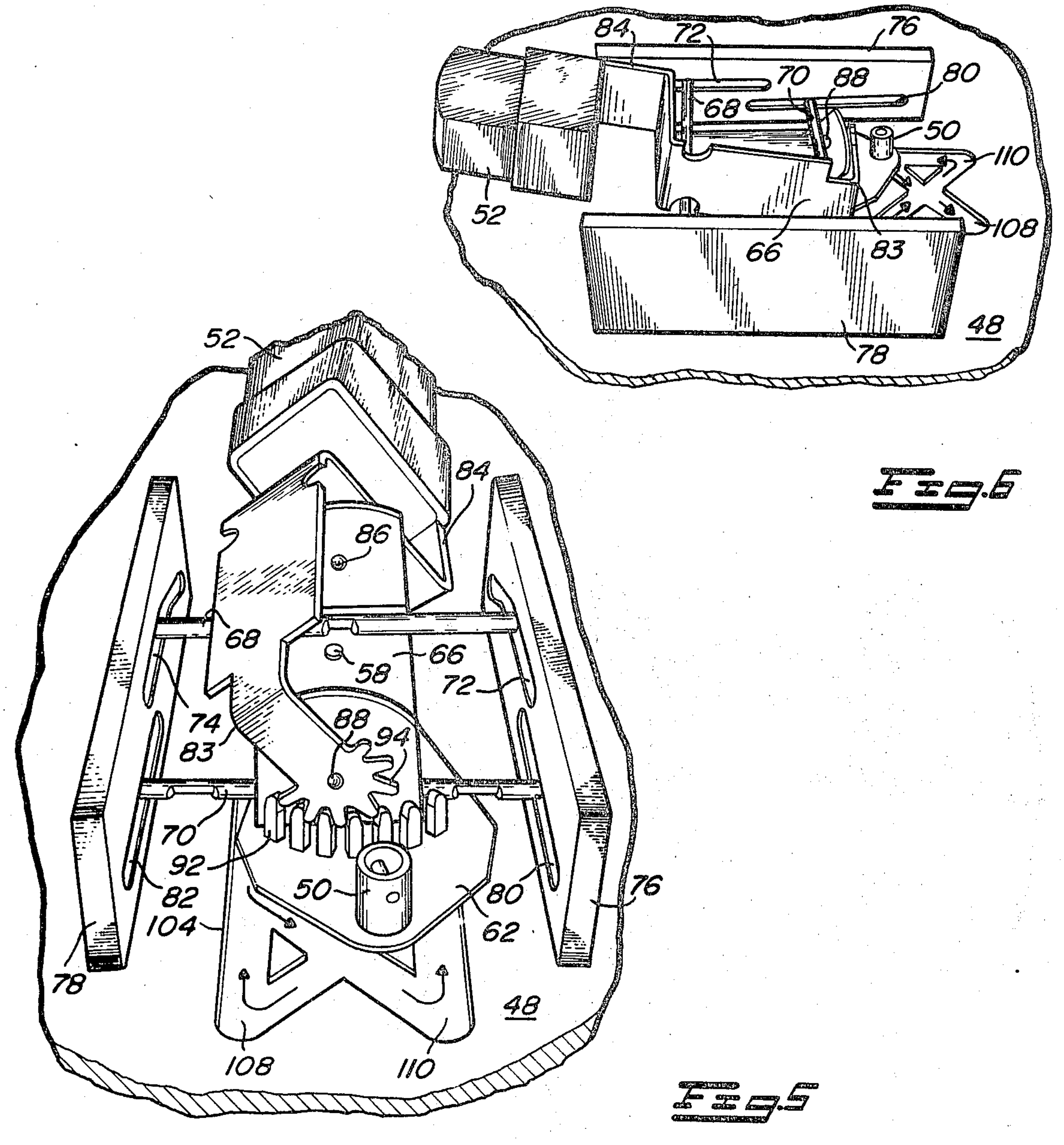
FIG. 5 is a perspective view from the rear of the embodiment of FIG. 4.
FIG. 6 is a side elevation view in perspective of the embodiment of FIG. 4 taken with the tape head partially rotated.

The tape head support frame 84 engages the carriage rack 66 through a pair of ball bearing movements 86 and 88 as the solenoid 56, which may be actuated by the tape, and rod 57 (FIG. 7) which draws the actuating pin 58 (from left to right in FIG. 7), the tape head 52 is disengaged from the tape 54 with the tape head raising due to the step-up cam slots 72 and 74 to provide clearance for rotation of the tape head 52 with respect to the base plate 48. The track pin 50 slides in the cam slot 46 in the direction of the arrows away from the tape (FIG. 4). At point 90 the track pin begins transverse motion across the base plate in the direction of the arrow drawn nearest point 90 in FIG. 4. The gear rack 92 of the gear rack plate 62 no longer moves only to the rear of the rotating mechanism but also moves from right to left (FIG. 5). With this transverse motion, the gear rack 92 causes the pinion gear 94 to rotate the tape head frame 84. This transverse motion of the track pin also causes a clockwise rotation (FIG. 4) of the gear rack plate 62 about pin 58 which rides on the base plate 48 and carriage bracket 66, with the pin 96 following the arcuate slot 65 in gear rack plate 62.

With the tape head rotated 180° the return spring 59 causes the actuating pin 58 to return the tape head 52 to engagement with the tape 54 with the track pin 50 sliding along a second leg or portion 108 of the cam track 46 to its rest position.

Subsequent activation of the rotator mechanism, the tape head again causes the tape head to disengage and rise to provide clearance from the base plate 46 and rotation in the counter clockwise direction with the track pin following the remaining set of arrows, beginning its transverse motion at point 104 and ending in leg 110 of the cam track 46.

What we have, therefore, is an economical reel-to-reel tape recorder/reproducer which reproduces all the tracks on a multi-track tape and which utilizes only one tape head.

I claim:

1. A tape recorder/reproducer utilizing tape having at least two sets of tracks thereon including in combination, a tape head having a pick up portion, actuator means, drive gear means coupled to said actuator means, said drive gear means including a portion having a plurality of gear sections, a cam mounted for rotation by said drive gear means, a shaft having said tape head mounted on one end thereof and gear means mounted on the other end thereof, and means for mounting said shaft for longitudinally slidable movement, whereby said actuator means in response to a predetermined event rotates said drive means to engage said cam with said gear means on the end of said shaft to longitudinally slide the shaft thereby moving said tape head away from the tape, with one of said plurality of gear sections of said drive gear means engaging said gear means on said shaft to rotate said tape head 180°, and resilient means connected between said shaft mounting means and said tape head for re-engaging said tape head with said tape with said tape head being rotated 180°.

2. The tape recorder/reproducer of claim 1 wherein said gear means connected to the end of said shaft is a pinion gear.

3. The tape recorder/reproducer of claim 2 wherein said actuator means is a gear rack, and said drive gear means includes a round gear having a face, with said cam being eliptical in shape and being mounted on the face of said round gear.

4. A tape recorder/reproducer according to claim 1 wherein said means for supporting said shaft includes a housing and bearings in said housing.

* * * * *

UNITED STATES PATENT OFFICE
CERTIFICATE OF CORRECTION

PATENT NO. : 3,855,628

DATED : December 17, 1974

INVENTOR(S) : Mario E. Bachmann

It is certified that error appears in the above-identified patent and that said Letters Patent are hereby corrected as shown below:

Column 1, line 31 change "dirve" to --drive--.

Column 2, line 33 change "HOwever" to --However--.

Column 4, line 59 change "A" to --The--.

Signed and sealed this 27th day of May 1975.

(SEAL)
Attest:

RUTH C. MASON
Attesting Officer

C. MARSHALL DANN
Commissioner of Patents
and Trademarks